(12) United States Patent
Kanevsky et al.

(10) Patent No.: US 6,919,866 B2
(45) Date of Patent: Jul. 19, 2005

(54) VEHICULAR NAVIGATION SYSTEM

(75) Inventors: Dimitri Kanevsky, Ossining, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 09/777,404

(22) Filed: Feb. 6, 2001

(65) Prior Publication Data

US 2002/0105481 A1 Aug. 8, 2002

(51) Int. Cl.$^7$ ................................................ G09G 5/00
(52) U.S. Cl. .................. 345/8; 345/7; 345/9; 345/633; 359/13; 359/360; 701/211
(58) Field of Search .................. 345/7–9, 633; 359/13, 630; 701/1, 211, 23–24, 200, 207–220, 301–302

(56) References Cited

U.S. PATENT DOCUMENTS

| | | | | |
|---|---|---|---|---|
| 5,281,957 A | * | 1/1994 | Schoolman ..................... 345/8 |
| 5,422,812 A | * | 6/1995 | Knoll et al. ................. 340/990 |
| 5,469,298 A | * | 11/1995 | Suman et al. ............... 296/37.7 |
| 5,504,622 A | * | 4/1996 | Oikawa et al. ................. 345/7 |
| 5,864,128 A | * | 1/1999 | Plesko .................... 235/462.35 |
| 5,991,085 A | | 11/1999 | Rallison et al. |
| 6,081,388 A | * | 6/2000 | Widl ........................... 359/666 |
| 6,094,242 A | | 7/2000 | Yamanaka |
| 6,157,890 A | * | 12/2000 | Nakai et al. ................. 340/988 |
| 6,199,014 B1 | * | 3/2001 | Walker et al. ............... 340/995 |
| 6,212,472 B1 | * | 4/2001 | Nonaka et al. ............. 340/990 |
| 6,226,389 B1 | * | 5/2001 | Lemelson et al. .......... 382/104 |
| 6,272,431 B1 | * | 8/2001 | Zamojdo et al. ............ 348/115 |
| 6,405,132 B1 | * | 6/2002 | Breed et al. ................. 701/117 |

* cited by examiner

*Primary Examiner*—Vijay Shankar
*Assistant Examiner*—Leonid Shapiro
(74) *Attorney, Agent, or Firm*—Scully, Scott, Murphy & Presser; Daniel P. Morris

(57) ABSTRACT

A vehicular navigation system which utilizes an optical arrangement installed in eyeglasses or on the vehicle window or windshield so as to impart improved guiding directions to the vehicle. The navigation system enables a user to display their positional coordinates through the intermediary of a global positioning system (GPS) which communicates with a computer of the system. An additional element to current GPS (Global Positioning Systems), which utilizes an optical system located either on the windshield of a vehicle, such as an automobile or truck, or on the eyeglasses of a driver, or possibly on the windshield of an aircraft, which mimics an arrow pointing in the direction in the driver should be traveling.

18 Claims, 4 Drawing Sheets

VEHICULAR NAVIGATION SYSTEM

BACKGROUND OF THE INVENTION

1. Field of the Invention

The present invention relates to a novel vehicular navigation system which utilizes an optical arrangement installed in eyeglasses or on the vehicle window or windshield so as to impart improved guiding directions to the vehicle. Currently employed navigation systems which are installed in vehicles, such as automobiles, enable a user to display their positional coordinates through the intermediary of a satellite and global positioning system (GPS) which also incorporate a map. There are also presently existing programs which are able to provide a user, such as a driver with directions as to how to reach a certain location and to assist the user in getting there by announcing or displaying on a digital map instructions as to where and when to turn the vehicle. The existing navigational systems are subject to several limitations and shortcomings.

Thus, it is quite possible that users of such systems; for instance such as the drivers of the vehicle may have reading disabilities so as to render him or her unable to use the existing systems to their fullest extent, because they may be incapable of adequately reading street signs. Therefore for example, in the event that if the navigational system directs them to enter a certain street, persons with reading disabilities may have difficulties in being able to do so because they cannot readily read the signs.

Moreover, the presently known system can only approximate directions or a route to a certain destination and cannot specify exactly into which narrow side street to enter or which corner to turn in certain geographical areas. For instance, if a vehicle reaches a fork in the road or the intersection of several small roads, and the vehicle has to travel to a specified point (for instance, such as a designated tall building), the existing navigational systems are incapable of providing such precise directions.

2. Discussion of the Prior Art

Among presently known devices which disclose navigation systems are Schoolman U.S. Pat. No. 5,281,957, the latter of which is directed to the provision of a head-mounted device in the form of eyeglasses incorporating a LCD display. The head-mounted device is adapted to be connected to a portable computer which may transmit a moving map installation to the eyeglasses or lenses thereof while being worn by a driver of a vehicle, such as a truck or an automobile, or the pilot of an airplane.

Other published navigational systems of this type are represented by Yamanaka U.S. Pat. No. 5,911,085. However, neither of these patents, nor other publications, disclose a navigational system in accordance with the present invention, which is adapted to improve upon currently available and commercially employed systems of the type considered herein.

SUMMARY OF THE INVENTION

Accordingly, in order to improve upon the present state of this technology, the present invention sets forth an additional novel element to current GPS (Global Positioning Systems), which utilizes an optical system located either on the windshield of a vehicle, such as an automobile or truck, or on the eyeglasses of a driver, or possibly on the windshield of an aircraft, which mimics an arrow pointing in the direction in the driver should be traveling. The arrow is represented as though it is floating in midair, and can impart information to the driver as to where and how to proceed in an exact manner during every moment of the trip, by continually pointing towards a designated or necessary roadway or landmark, and wherein the inventive optical navigational system is described in further detail hereinbelow*—in conjunction with the drawing figures.

In general terms, the system consists of optical lenses which can curve and change in shape in order to be able to display the image of a 3-dimensional arrow according to from where incident light is received. The system also possesses the dimensional ability to cause the arrow to appear either closer or more distantly in correlation with the position of the desired location, in order to be able to assist the driver in understanding as to where and how closely or soon in time certain turns or changes in direction are to be expedited. For this reason, the angle at which light is incident on the desired landmark, object, or location must also coincide with the angle at which light is incident on the arrow in order to impart the impression to a driver that the arrow is exactly at the position of the locale to with the driver is traveling. The image of the object to which the arrow is pointing must be transmitted through a computer which analyzes the object, determines the distance to this object, and by means of this method determines through the intermediary of an automatic algorithm the extent to which the lenses on the eyeglasses or the vehicular windshield must curve in order to display the arrow correctly. In addition to the foregoing, the inventive system must implement an automatic reading device which can assist people, such as drivers, who may be subject to reading disabilities, by scanning street signs and reciting their names in a loud or highly audible manner. Similarly, this system can also adapted to identify the colors of an illuminated traffic light, and to be able to inform a colorblind driver as to whether or not to proceed or to stop the vehicle.

The inventive navigation system is capable of precisely informing a person or driver as to which street to turn onto, irrespective as to whether the street is secondary or extremely narrow or small, as well as being capable of pointing out reference landmarks or buildings and consequently advising the driver to proceed in that particular direction. The optical navigational system is adapted to be used in conjunction with existing GPS, as more precisely explained in the following detailed description of the invention.

Accordingly, an object of the invention is the provision of an improved vehicular navigational guidance system which employs an optical system installed in eyeglasses, or on the windshield or front side windows of a vehicle in order to represent images which impart traveling directions to a driver of the vehicle.

Another object of the invention is to provide a graphical representation system in optical displays which enables a driver to focus on objects which the driver observes displayed on the vehicle windows.

Another object of the invention is the provision of an intelligent navigational system which is capable of assisting drivers with enhanced reading abilities, such as to be able to read displayed names of streets.

Another object of the invention is the provision of an intelligent navigational system which is adapted to assist colorblind drivers in recognizing the different colors of traffic lights.

Another object of the invention is the provision of a GPS that assists the navigational guidance system in a manner which provide information to the driver about objects which he observes in the window and which the driver utilizes by focusing on these objects through the use of a special pointing system to assist in driving the vehicle in the intended direction.

BRIEF DESCRIPTION OF THE DRAWINGS

Reference may now be made to the following detailed description of preferred embodiments of the invention, taken in conjunction with the accompanying drawings; in which.

DETAILED DESCRIPTION OF PREFERRED EMBODIMENTS

Figure 1:
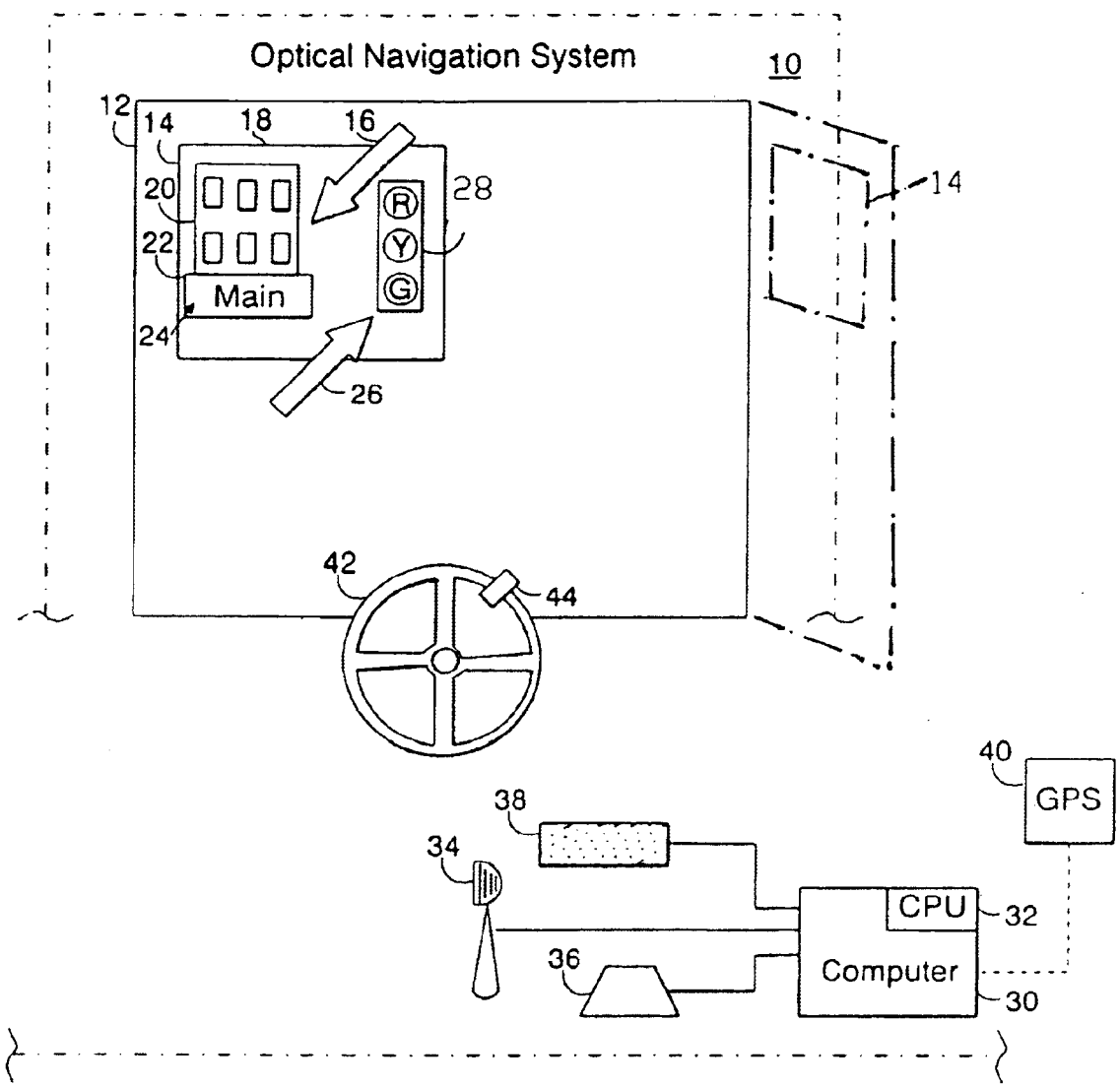
FIG. 1 illustrates a generally schematic representative scenario of the optical navigation system of the invention for a vehicle, such as an automobile.

FIG. 1 illustrates a general scenario of the optical navigation system for an automotive vehicle 10. Module 12 represents the windshield of the vehicle 10, represented as viewed facing forwardly out through the windshield. Similar systems can also be used for automobile side windows, whereby there is shown the optical system 14 which is displayed on the windshield 12. Arrow 16 is displayed on an optical system portion 18 on the windshield 12 and is shown pointing towards a building 20, on the latter of which there is arranged a sign 22 having a street name 24 thereon. Another arrow 26 points towards an illuminated traffic light 28, having red, yellow and green lights R,Y,G.

The windshield 12 is operatively connected to a computer 30 which contains a running CPU 32. The computer 30 is connected with a microphone 34, a speaker 36, and another means 38 for keyboard-like or hand-written input. This computer 30 contains a system which analyzes the information displayed on the windshield 12 of the vehicle 10. The computer operates the arrows 16, 26 which are displayed on the windshield 12, as well as being adapted to receive commands from the driver through the microphone 34 or other inputs 38 while communicating with a Global Positioning System (GPS) 40.

A steering wheel 42 of the vehicle 10 is equipped with a mouse 44 which controls the movement of the arrows 16 and 26 on the windshield 12 and allows the driver to interrogate the computer 30 as to the name of a certain street, by clicking on it and speaking the question into the microphone 34; or selectively with regard to the colors of the traffic light 28.

Figure 2:
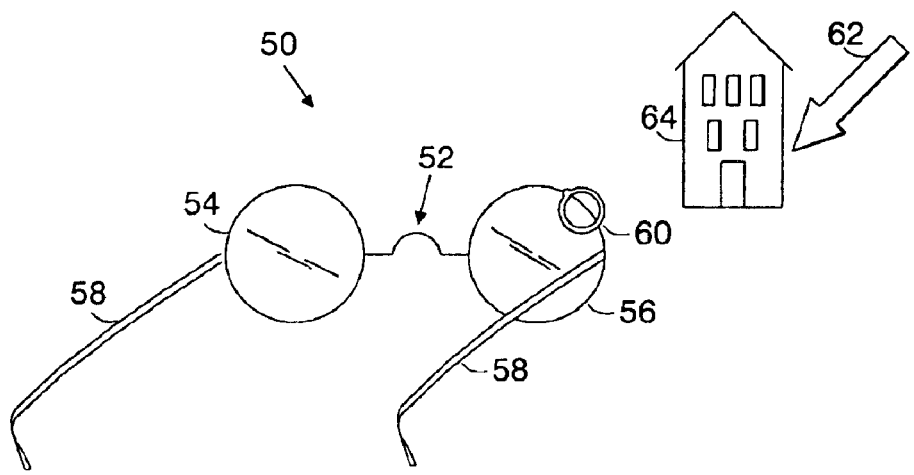
FIG. 2 illustrates the optical navigational system for use in eye glasses.

Referring to FIG. 2 of the drawings, a portable or "laptop" computer may have an associated head-mounted display, arrangement 50. The display arrangement 50 is constructed in a manner simulating a pair of eyeglasses 52, but with liquid crystal display (LCD) screens replacing or forming a portion of the eyeglass lenses 54,56. The display screens can be either opaque or light transmitting, and can be hinge mounted to the eyeglass frame 58 so that they can be swung up and out of the field of vision of the user when not in use. Specialized uses for the portable computer and head-mounted display may include a computer desk for secretarial workstations and the like, a research library workstation, and a moving map installation in an automobile or airplane (not-shown).

The head-mounted personal visual display apparatus with image generator and holder set forth the details for an optical system which enables a computer to display on the lenses of eyeglasses what it would normally display on a monitor. Therefore, everything which is displayed on the vehicle windshield 12 of FIG. 1 can be displayed on the lenses 54,56 of the pair of eyeglasses 52 through the use of a special optical system and projector. The eyeglasses are represented by the module 52 and the optical system which manipulates the lenses to display an arrow is represented by module 60, an arrow 62 is shown pointing at a particular object 64, such as a building, landmark, sign or traffic light, as in the instance of the windshield 12 in FIG. 1. Similarly, it is possible to employ an optical system as described on automobile front side windows. This would allow to a driver to point to objects that are passed near the vehicle towards either the left or the right thereof and to interrogate the computer about them, for instance, such as a street name, a building, a landmark or the like.

Figure 3:
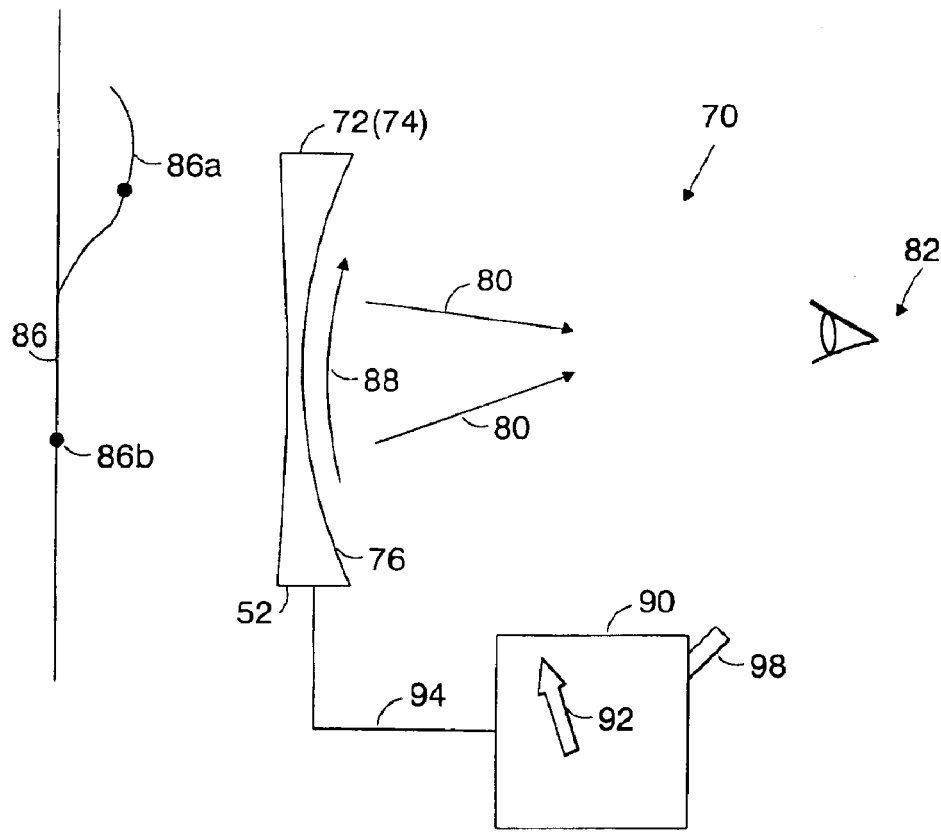
FIG. 3 illustrates a schematic representation of the optical navigational system comprising the lenses of the eyeglasses of FIG. 2.

FIG. 3 illustrates a schematic representation of an optical system 70 comprising the eyeglass lenses 72 or 74. Lens 72 can be located on either a vehicle windshield 12 (FIG. 1) or on a pair of eyeglasses 52 (FIG. 2) and contains a curved lens portion 76 which can change its degree of curvature. The degree of the curvature affects the rays of light 80 passing into the pupil 82 of an eye of a user. In essence, the rays of light 80 can change direction depending upon which direction the rays of light 80 entered the lens 72 (74) and further penetrate the pupil 84, thereby creating an illusion as to how near or far an arrow may appear to a viewer.

The image represented by rays 80 originates from 86a, 86, and 86b which are points on an object (i.e. such as a tree). If the angle of the rays of light 86a, 86 an 86b coincides with the angle of rays of light emanating from lens portion 88 on the lenses, there is then created the illusion that the arrow on lens 88, is on the tree. The image of the arrow from lens portion 88 is transmitted from the computer 90 which contains arrow 92, via wire 94 onto the optical lenses, whereby the module 98 controls the direction of the arrow 92.

Figure 4:
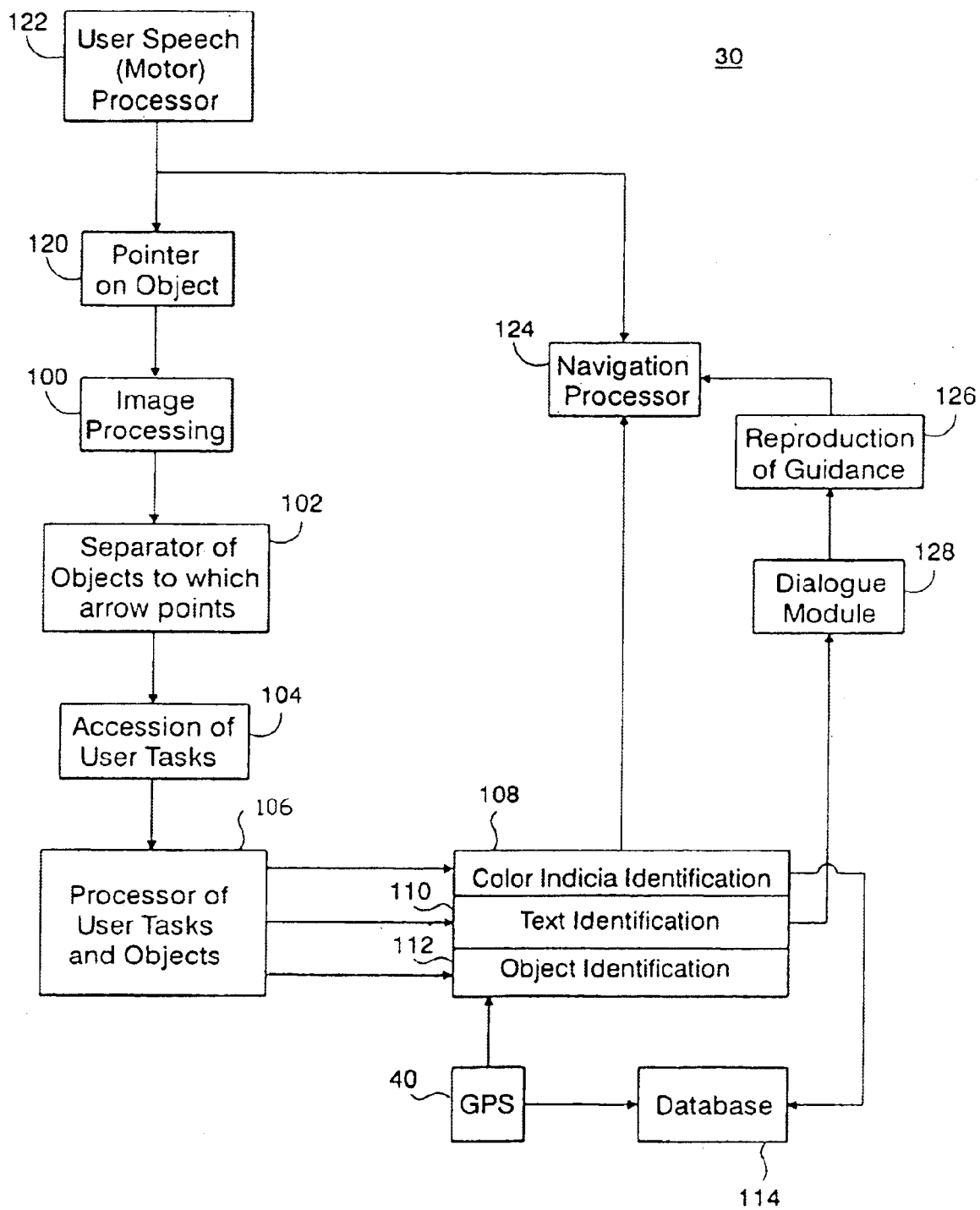
FIG. 4 illustrates the functional structure of a computer for the system.

FIG. 4 illustrates diagrammatically a chart which explains the operative structure of the computer 30 of FIG. 1. A module 100 effects the standard image processing of the images transmitted into the computer; which in essence, relates to a relatively standard procedure. This module 100 quantifies, digitizes, compares, and determines the image contours according to a specific reference. Module 102 is a separator of objects to which the arrow points by identifying the contours of an image. For example, if an arrow is pointing at a building, the building has certain definitive contours which set it apart from its surrounding objects. Module 104 performs an accession of user tasks, whereby this identifies whether the user would like the computer 30 to read a street-sign, obtain directions to a certain location, or define the color of a certain object, such as a traffic light. Depending on this, the processor of user tasks and objects 106 then proceeds with a command. Color identification can be performed at 108, text identification can be performed, or objects may be identified at 110 or 112. For example, the user would like to identify a building to which he or she wishes to travel. The object identification is connected to the global positioning system (GPS) 40 which is connected to a database 114 which contains the coordinates of the objects on a map.

Block 120 is a pointer on the object which depends on how several other blocks work. It depends on the user speech and motor processor 122 module which receives commands from the user as to where to aim the pointer. The user may also operate the pointer through the mouse 44 which located on or near the steering wheel 42 (FIG. 1) in order to manually locate objects on a map displayed on the windshield 12 or a lens 52, 54, or on the outside of the vehicle 10 through the windshield on buildings, streets and landmarks. Module 124 is a navigation processor connected to the GPS database which provides a driver with guidance 126 on how to reach a certain object. Once the object has appeared in view of the vehicle, then the information from the GPS database can be used to place the arrow upon the object. Block 128 represents a dialogue module which is connected with the text, color, and object identification modules serving to improve upon on understanding of a question from a user. The system can request a person to better explain a question, better identify as to where the arrow is pointing, or better identify the information a person requires from the system. The methodology of the dialogue module 128 is described in copending U.S. patent application Ser. No. 09/078,807, filed on May 14, 1998, commonly assigned to the present assignee, and the disclosure of which is incorporated herein by reference.

Figure 5:
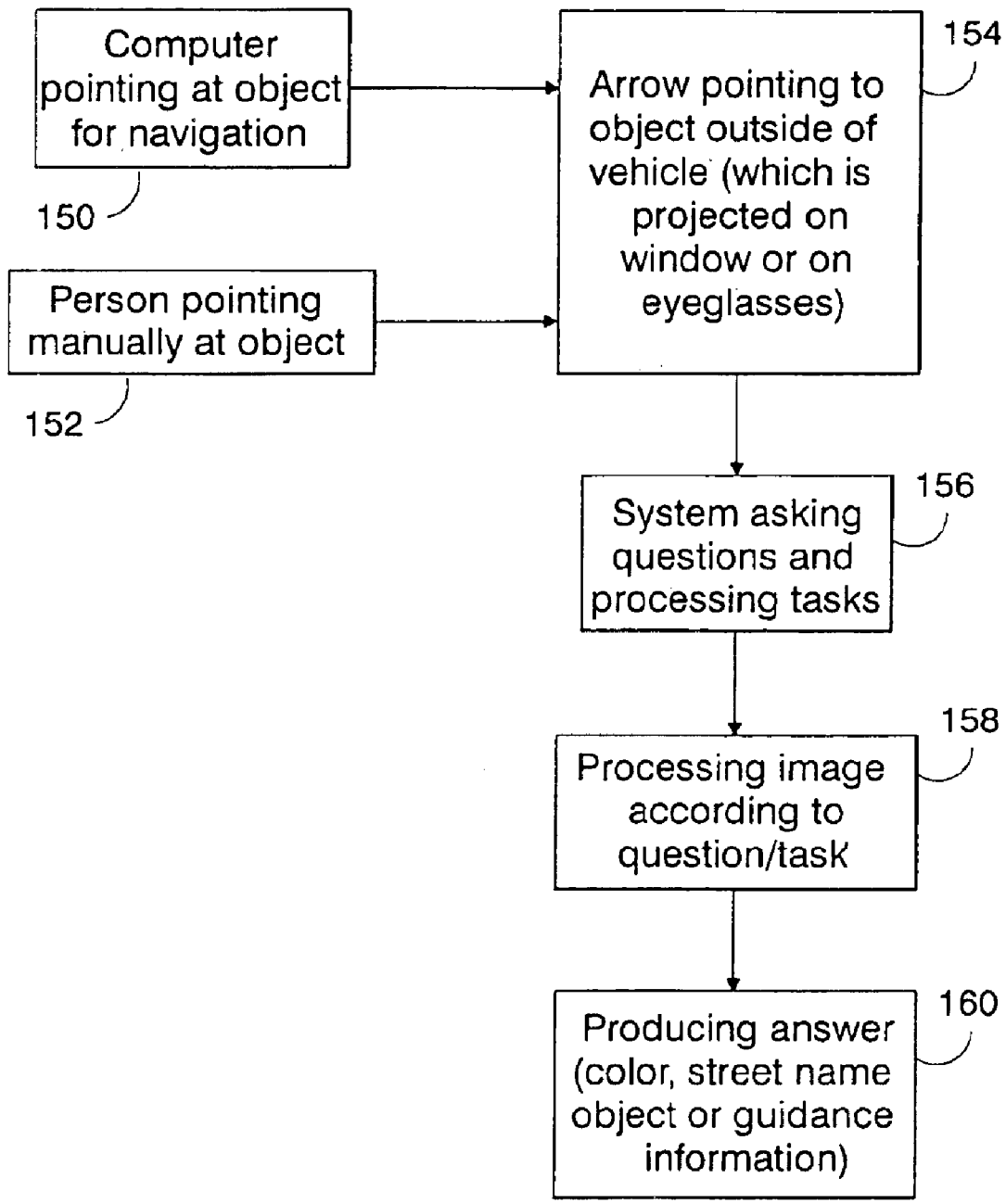
FIG. 5 illustrates a general flowchart of the navigational system of the invention.

FIG. 5 represents a general flowchart of the invention, wherein module 150 is a computer pointing at an object for navigation. In module 152, a person is assured to be pointing manually at an object for purposes of navigation. Module 154 is a general block which represents an arrow pointing towards an object outside of the vehicle 10 via the image arrow 16 which is projected on eyeglasses 52,54 or an automobile windshield 12, while it decides whether the driver should manually point or whether the computer points. In module 156, the system asks questions and processes tasks, for example, such as reading a sign, determining color, or identifying an object. Module 158 processes an image in accordance with a question or a task. For example, an image of a building is processed to determine its contour, the image of a sign is taken in order to read the letters, or an image of a traffic light in order to determine the illuminated color, i.e. red, yellow or green. Module 160 produces an answer for the driver, such as color, name of a street, name of an object or landmark, or provides guidance and directions on how to reach a location, and the like.

While the invention has been particularly shown and described with respect to illustrative embodiments thereof, it will be understood by those skilled in the art that the foregoing and other changes in form and details may be made therein without departing from the spirit and scope of the invention which should be limited only by the scope of the appended claims.

What is claimed is:

1. A navigational system for an automotive vehicle or aircraft comprising an optical arrangement installed on at least one transparent viewing surface for a driver of the vehicle, said optical arrangement representing images displayed on said at least one viewing surface producing guiding images for imparting directions to the driver; said at least one viewing surface being selectively the windshield or side front window of said vehicle or eyeglasses worn by the driver and comprising lenses of said optical arrangement having at least one arrow provided thereon, said lenses having regulatable degrees of curvature and through which there are displayed objects located exteriorly of said vehicle, said lens curvatures facilitating a 3-dimensional spatial image perception; said images comprise graphical representations pointing towards real objects observed by the driver; said graphical representations comprising an image of at least one arrow display on said at least one viewing surface pointing towards a selected real object for guiding the driver in a specified direction of travel; said system being in operative communications with a global positioning systems (GPS) so ms to impart information to the driver regarding objects observed on said at least one viewing surface and as indicated by the driver by pointing to the objects with pointing means; wherein control means in the form of a mouse for operating said system are mounted on a drive steering wheel of said vehicle or pilot controls of said aircraft.

2. A navigational system as claimed in claim 1, wherein said at least one arrow is projected on said at least one viewing surface so as to be perceived in a 3-dimensional spatial image.

3. A navigational system as claimed in claim 1, wherein said system comprises means to assist drivers of the vehicle having reading disabilities and restrictions to read the names of objects and streets displayed on said at least one viewing surface.

4. A navigational system as claimed in claim 1, wherein said system comprises means to assist drivers of the vehicle to recognize the colors of traffic lights as displayed on said at least one viewing surface.

5. A navigational system as claimed in claim 1, wherein said pointing means comprise said at least one arrow.

6. A navigational system as claimed in claim 1, wherein a computer is operatively connected to said system for operating said at least one arrow; means for inputting information to said computer by said driver; said computer including means for analyzing said information displayed on said at least one viewing surface while communicating with said global positioning system, and imparting directional instructions to said driver in responsive to processing of said items of information.

7. A navigational system as claimed in claim 6, wherein said information is inputted to said computer through a microphone in the form of verbal commands, and instructions received through a loudspeaker.

8. A navigational system as claimed in claim 7, wherein said information is inputted to said computer through handwritten or keyboard-operated functions.

9. A navigational system as claimed in claim 6, wherein said computer processes interrogations from said system regarding tasks including the reading of signs, determining colors and identifying objects, processing images related to specified tasks and providing answers to the driver responsive thereto which are displayed on said at least one viewing surface to assist the driver in directional guidance of the vehicle.

10. A method for the navigation of an automotive vehicle or aircraft comprising installing an optical arrangement on at least one transparent viewing surface for a driver of the vehicle, said optical arrangement representing images displayed on said at least one viewing surface producing guiding images for imparting directions to the driver; said images comprising graphical representations pointing towards real objects observed by the driver; said at least one viewing surface being selectively the windshield or side front window of said vehicle or eyeglasses worn by the driver and comprising lenses of said optical arrangement having at least one arrow provided thereon, said lenses having regulatable degrees of curvature and through which there are displayed objects located exteriorly of said vehicle, said lens curvatures facilitating a 3-dimensional spatial image perception; said graphical representations comprising an image of at least one arrow display on said at least one viewing surface pointing towards a selected real object for guiding the driver in a specified direction of travel; said system being in operative communications with a global positioning system (GPS) so as to impart information to the driver regarding objects observed on said at least one viewing surface and as indicated by the driver by pointing to the objects with pointing means: wherein a control consisting of a mouse for operating said system is mounted on a driver steering wheel of said vehicle or pilot controls of said aircraft.

11. A navigation method as claimed in claim 10, wherein said at least one arrow is projected on said at least one viewing surface so as to be perceived in a 3-dimensional spatial image.

12. A navigation system as claimed in claim 10, wherein said system to assists drivers of the vehicle having reading disabilities and restrictions in reading the names of objects and streets displayed on said at least one viewing surface.

13. A navigation method as claimed in claim 10, wherein said system comprises assisting drivers of the vehicle in recognizing the colors of traffic lights as displayed on said at least on viewing surface.

14. A navigation method as claimed in claim 10, wherein said pointing means comprise said at least one arrow.

15. A navigational system as claimed in claim 10, wherein a computer is operatively connected to said system for operating said at least one arrow; inputting information to said computer by said driver; said computer analyzing said information displayed on said at least one viewing surface while communicating with said global positioning system, and imparting directional instructions to said driver in responsive to processing of said items of information.

16. A navigation method as claimed in claim 15, wherein said information is inputted to said computer through a microphone in the form of verbal commands, and instructions received through a loudspeaker.

17. A navigation method as claimed in claim 16, wherein said information is inputted to said computer through handwritten or keyboard-operated functions.

18. A navigation method as claimed in claim 15, wherein said computer processes interrogations from said system regarding tasks including the reading of signs, determining colors and identifying objects, processing images related to specified tasks and providing answers to the driver responsive thereto which are displayed on said at least one viewing surface to assist the driver in directional guidance of the vehicle.

* * * * *